United States Patent [19]

Redding

[11] 4,080,252
[45] Mar. 21, 1978

[54] NUCLEAR REACTOR CORE COOLING ARRANGEMENT

[75] Inventor: Arnold H. Redding, Export, Pa.

[73] Assignee: Westinghouse Electric Corporation, Pittsburgh, Pa.

[21] Appl. No.: 550,905

[22] Filed: Feb. 18, 1975

Related U.S. Application Data

[63] Continuation of Ser. No. 288,610, Sep. 13, 1972, now Defensive Publication No. T921,015.

[51] Int. Cl.$^2$ .................... G21C 15/18; G21C 15/24
[52] U.S. Cl. .................................. 176/38; 176/40; 176/61
[58] Field of Search .................. 176/37, 38, 40, 50, 176/61; 137/808, 810

[56] References Cited

U.S. PATENT DOCUMENTS

| 3,123,533 | 3/1964 | Galson | 176/38 |
| 3,202,584 | 8/1965 | Bogaardt | 176/61 |
| 3,400,047 | 9/1968 | Howard | 176/56 |
| 3,621,926 | 11/1971 | Townsend | 176/56 |
| 3,623,948 | 11/1971 | Dotson et al. | 176/50 |

FOREIGN PATENT DOCUMENTS

14,959    4/1974    Japan ................................. 176/38

OTHER PUBLICATIONS

Reactor Technology, vol. 13, No. 3, Summer 1970, "The Emergency Core-Cooling Problem in LMFBR's", pp. 280-309.
A SME Publication, "Response of a Piped LMFBR to Primary System Pipe Rupture" Beckett et al., 3/71.

Primary Examiner—Samuel W. Engle
Assistant Examiner—Ralph Palo
Attorney, Agent, or Firm—Edward L. Levine; Z. L. Dermer

[57] ABSTRACT

A core cooling system for a nuclear reactor having a plurality of primary fluid flow systems. The reactor coolant flow from the primary systems is joined upon entering the pressure vessel. Jointure is accomplished in a common chamber causing high coolant flow velocities at low static pressures. If a pipe ruptures in one of the primary fluid flow systems, the low pressure in the common chamber minimizes leakage from the intact flow systems. This allows continuation of coolant flow through the nuclear core for a sufficient length of time to effectively eliminate the possibility of thermal damage.

8 Claims, 7 Drawing Figures

NUCLEAR REACTOR CORE COOLING ARRANGEMENT

CROSS-REFERENCE TO RELATED APPLICATION

This application is a continuation of application Ser. No. 288,610 filed Sept. 13, 1972, now Defensive Publication No. T921,015,921 O.G. 867, published Apr. 16, 1974.

BACKGROUND OF THE INVENTION

1. Field of the Invention

This invention relates generally to nuclear reactors and more particularly to an emergency core cooling system for a liquid metal-cooled nuclear reactor.

2. Description of the Prior Art

A nuclear reactor is designed and operated for the purpose of initiating and maintaining a nuclear fission chain reaction in a fissile material for the generation of heat for power purposes. In the type of nuclear reactor described herein, fissile materials are contained within fuel rods or elements. A plurality of fuel elements or rods comprise a fuel assembly; a plurality of these assemblies comprise a nuclear core which is structurally supported within a hermetically sealed pressure vessel. A reactor coolant, such as liquid sodium is circulated into the reactor vessel and through the nuclear core where the heat generated by nuclear fission is transferred from the fuel assemblies to the reactor coolant. The heated reactor coolant exits from the pressure vessel and flows to a heat exchanger where the heat previously acquired is transferred to another flow system coupled in sealing arrangement with the heat exchanger. The cooled liquid sodium exits from the heat exchanger and flows to a pump which again circulates the reactor coolant into the pressure vessel, repeating the described flow cycle.

The system comprising the nuclear core, reactor vessel, heat exchanger, circulating pump, and the connecting piping is commonly referred to as the primary system. Liquid metal-cooled fast breeder reactor plants characteristically have two or more primary systems or primary loops.

In a nuclear reactor, one of the many accidents which must be guarded against is a double-ended rupture of the connecting piping leading from one of the pumps to the reactor pressure vessel. A double-ended rupture is one whereby the pipe breaks in a direction generally transverse to the axial center line of the pipe. In counter distinction, this type of rupture is not along the length of the pipe such as a failure of a pipe seam. If a double-ended rupture occurs, flow will be discharged out of both ends of the pipe until the reactor is shut down and the pumps can be slowed down sufficiently so that no more coolant is being pumped through the ruptured pipes. During this time, a considerable amount of coolant that is normally supplied to the nuclear core is diverted out the ruptured pipe (from both the ruptured and the intact flow loops) and does not cool the core. This situation may cause extremely high core temperatures resulting in failure of the fuel cladding and subsequent melting of the nuclear fuel contained within the nuclear core.

In the prior art, efforts to guard against the effects of the envisioned failure have included reactor designs which include check valves in each of the main coolant flow lines as they enter the reactor vessel, or by greatly increasing the number of flow loops and thereby reducing the effect of failure of any one flow loop. Unfortunately, the optimum location for the check valve is at the bottom of the reactor pressure vessel which makes maintenance very difficult. In addition, if it is necessary to rely on check valves in this very important way, it may be necessary to provide redundancy by including a number of check valves in series in each of the main coolant flow lines. Either solution, that is, greatly increasing the number of flow loops or providing a series of check valves, is expensive and adds complications to the plant which tend to reduce the overall plant availability as regards production of commercial electrical energy.

Another prior solution is to have a hydraulic diode which has no moving parts and gives performance like a check valve in having greatly reduced flow in the backward direction included in the main coolant flow lines. Efforts have been underway for a number of years to develop a hydraulic diode to perform this function, but the efforts have not been successful. Therefore, in the prior art, no practical solution to a double-ended pipe break of a main coolant flow line has been effectuated.

SUMMARY OF THE INVENTION

This invention provides a liquid metal cooled nuclear reactor with a simple and effective emergency core cooling system. The primary coolant flow lines of the reactor are joined by a common device within the pressure vessel. Within the device, the velocity of the total reactor coolant flow is greatly increased and correspondingly, static pressure is decreased substantially. In its simplest form, the device would be a velocity chamber having a flow cross-sectional area significantly less than that of the combined flow areas of the main flow lines. In order to maintain the same coolant flow rate through the reduced flow area, the velocity of the coolant must increase. And, in accordance with the conservation of energy theory, static pressure must decrease. If a rupture occurs in one of the loops, the velocity chamber acts as an ejector or jet pump. The reduced static pressure minimizes the pressure drop between the velocity chamber and the point of rupture and hence inhibits back flow from the intact loops to the point of rupture. Assuming that the reactor is shut down and the pumps are shut down immediately subsequent to the rupture, little coolant inventory will have been lost while sufficient flow will have been maintained through the core to insure no thermal damage.

From the above, it is readily seen that the present invention eliminates the expense and complications of the prior art while providing an effective emergency core cooling system. Further, the simplicity of the invention insures maintenance-free operation assuring little or no reactor down time.

BRIEF DESCRIPTION OF THE DRAWINGS

Other advantages of the invention will be apparent from the following detailed description taken in consideration with the accompanying drawings, in which.

DESCRIPTION OF THE PREFERRED EMBODIMENTS

Figure 1:
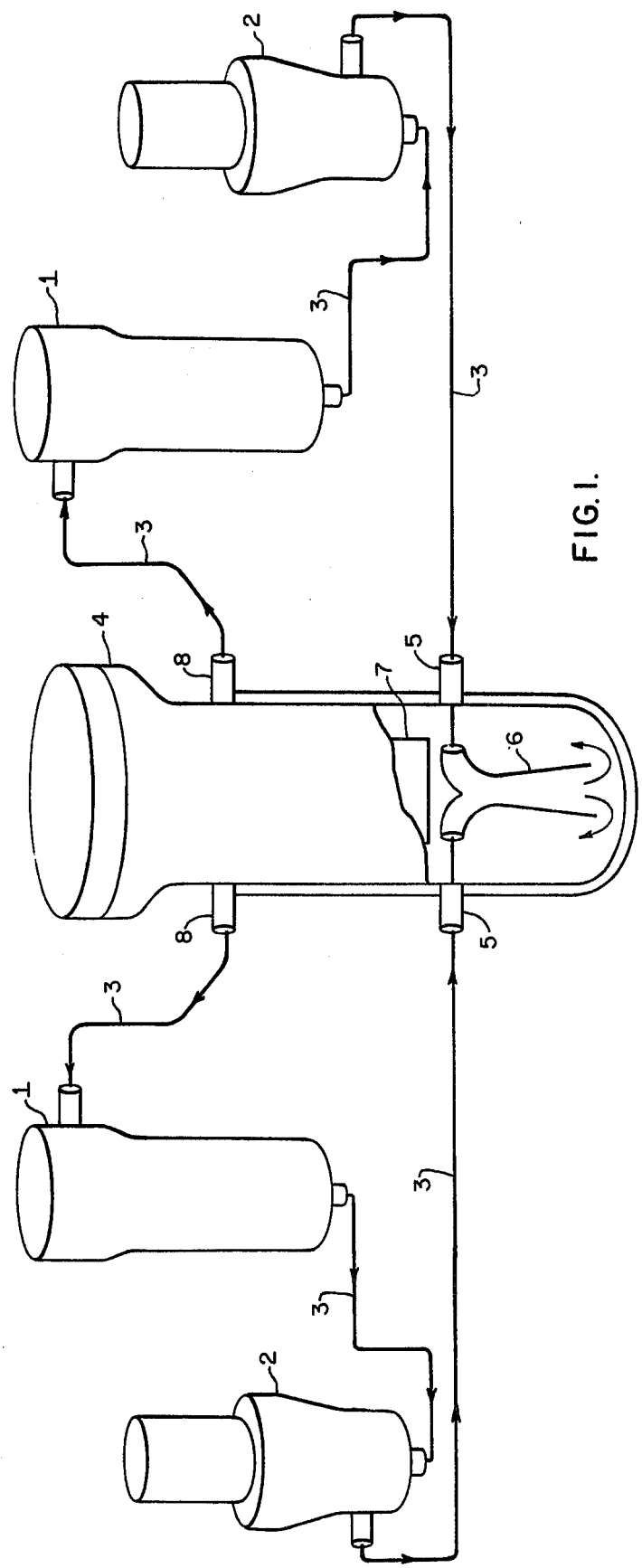
FIG. 1 is a schematic of a nuclear reactor having two primary systems and incorporating one version of this invention.

Throughout the description which follows, like reference characters indicate like elements in the various figures of the drawings.

Referring now more particularly to FIG. 1 of the drawings, a nuclear reactor having two primary systems or flow loops is illustrated. Each primary system comprises a separate coolant flow loop containing a heat exchanger 1, a main coolant circulating pump 2 and main coolant piping 3 in series connection with a reactor vessel 4. A nuclear reactor characteristically contains only one reactor pressure vessel 4 which is common to all primary systems. A reactor coolant, such as liquid sodium, is circulated within each of the primary systems. The function of the reactor coolant is to remove and transfer heat generated by a nuclear core, contained within the reactor vessel 4, to another fluid in a secondary flow system. It is within this secondary system that the nuclear heat is converted to steam which is then converted to electricity.

Still referring to FIG. 1 of the drawings, the reactor coolant flows through a nuclear core 7 contained within the reactor vessel 4 where it acquires heat produced by the nuclear chain reaction and exits through the outlet nozzle 8. The hot reactor coolant then enters and flows through the heat exchanger 1 where it transfers the previously acquired heat to a secondary system fluid which is coupled in sealing arrangement with the reactor coolant flow passages in the heat exchanger 1. The cooled reactor coolant exits from the heat exchanger 1, flows through a section of connecting piping 3 and enters the main coolant circulating pump 2 which serves to circulate the coolant through the primary system. On exiting from the circulating pump 2, the reactor coolant flows through another section of connecting piping 3 and enters the pressure vessel 4 by way of an inlet nozzle 5. Within the pressure vessel 4, the reactor coolant enters hydraulic flow control means 6, as provided by this invention. The coolant flow from all primary systems is joined at this point of the flow cycle. Within the hydraulic flow control means comprising a velocity chamber 6, the velocity of the combined reactor coolant is greatly increased and the static pressure is correspondingly decreased. As the total coolant moves to the exit of the velocity chamber 6, the reactor coolant diffuses thereby converting velocity back into static pressure. The reactor coolant then again flows up through the nuclear core 7 repeating the described flow cycle in continuous fashion throughout the operation of the nuclear reactor. It is to be observed, that although the primary systems illustrated in FIG. 1 are for a liquid metal-cooled fast breeder reactor, the invention equally applies to any reactor system provided a liquid coolant is utilized at relatively low primary system pressures. Similarly, the two primary systems shown in FIG. 1 are intended to be illustrative and the invention may be applied to a reactor system having two or more primary systems.

Figure 2:
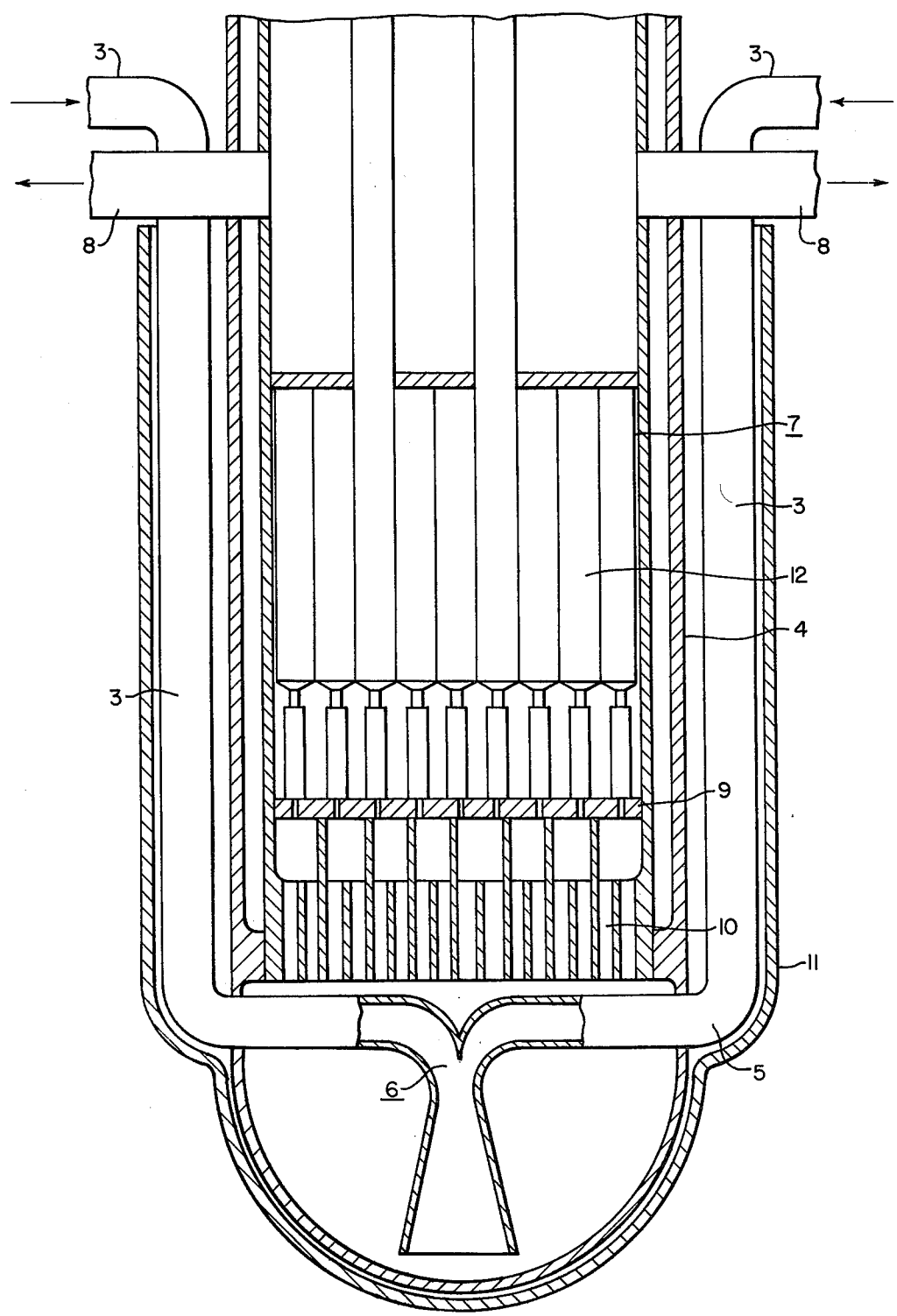
FIG. 2 is a vertical cross-sectional view of a nuclear reactor vessel incorporating one version of this invention.

The details of one version of the hydraulic flow control means and the reactor pressure vessel 4 may be seen in FIG. 2. A nuclear core 7 comprising a plurality of fuel assemblies 12 is structurally supported within the reactor vessel 4. Although not shown, flow channels are provided within the nuclear core 7 for ingress and egress of the reactor coolant. Flow channels are also provided, for similar reasons, in the structural elements such as a core support plate 9 and a lower core support structure 10. The coolant flow line 3, external to the reactor pressure vessel 4, is part of the connecting piping 3 between the reactor pressure vessel 4 and the circulating pump 2, (FIG. 1). A guard vessel 11, open at the top, completely surrounds piping 3 and the lower part of the reactor pressure vessel 4. The purpose of the guard vessel 11 is to assure core submergence by a pool of reactor coolant should a leak or break develop in the reactor pressure vessel 4.

Figure 5A:
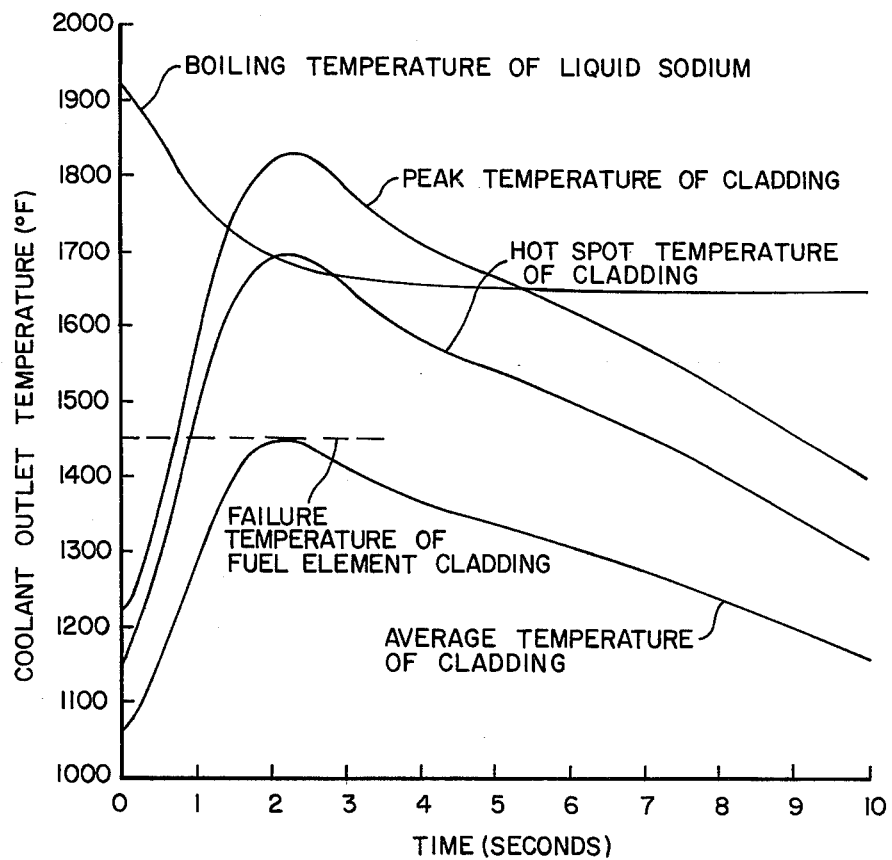
FIGS. 5a and 5b are graphs showing the effects on fuel cladding temperature, both with and without this invention.

Assurance of core submergence is a post accident safety feature which provides for removal of decay heat generated by the nuclear core 7 following plant shut down. On the other hand, the core cooling provided by the velocity chamber 6 provides for emergency core cooling during the critical period after a connecting pipe 3 ruptures but before plant shutdown. Without the disclosed core cooling system, a rupture of the piping 3, especially between the pump 2 and the reactor pressure vessel 4, will discharge coolant out of both ends of the pipe break while the nuclear core 7 is still generating heat. The pump 2 in the ruptured primary flow loop will discharge coolant out of one end of the pipe, while the pump 2 in the intact primary flow loops will cause the reactor coolant to bypass the nuclear core 7 and discharge coolant out of the other end of the pipe break. These events will occur so rapidly following a connecting pipe 3 break that large quantities of reactor coolant will be pumped through the ruptured pipes before the pumps 2 can be slowed sufficiently. The diverted reactor coolant will not be available to cool the nuclear core 7 causing fuel element cladding to rise dangerously. FIG. 5a shows the effect of reduced core flow on cladding temperature. Conservatively assuming that cladding failure occurs at 1450° F, it is readily seen that the average temperature of the cladding exceeds the failure limit. In addition, localized peak temperatures and cladding hot spot temperatures clearly exceed the failure limit. The problem is further complicated by these high temperatures which exceed the boiling point of the liquid coolant, for example sodium, which reduces the heat transfer characteristics of the coolant and result in even higher cladding temperatures.

Referring again to FIG. 2, the reactor coolant flows down the vertical length of connecting piping 3 and enters the pressure vessel 4 through an inlet nozzle 5. The flow from all the primary systems then flows through a corresponding horizontal section of the velocity chamber 6, turns 90° and joins together in an essentially parallel manner to minimize friction flow loss. The cross sectional flow area at this point is less than the combined cross sectional flow areas of the connecting piping 3 of all the primary systems, therefore, the velocity of the flow is increased. The cross sectional flow area of the velocity chamber 6 continues to decrease until a minimum is reached which corresponds to a maximum flow velocity and a designed minimum static pressure. The cross sectional flow area then gradually increases, slowing down the flow until it has recovered most of its static pressure and is moving at an acceptable velocity to turn 180° and flow up through the reactor vessel with a minimum friction flow loss. If the previously envisioned connecting pipe 3 rupture now occurs, the velocity chamber 6 acts as an ejector or jet pump. If the geometries are properly selected it will not suck in any gas, but will operate in a regime of either no flow or slight outward leakage of coolant. This is because the lower static pressure within the velocity chamber 6 minimizes the pressure differential, which is the driving force, between the velocity chamber 6 and the point of the rupture. If the pumps 2 are then stopped reasonably soon, as in any emergency situation, a minimal amount of liquid coolant will have been lost. The coolant loss will occur primarily from the discharge caused by the circulating pump 2 in the ruptured loop. The flow through the intact loops which includes flow through the nuclear core 7, will have been maintained for a sufficient length of time to adequately cool the nuclear core 7 and prevent failure of the fuel element cladding.

Figure 4:
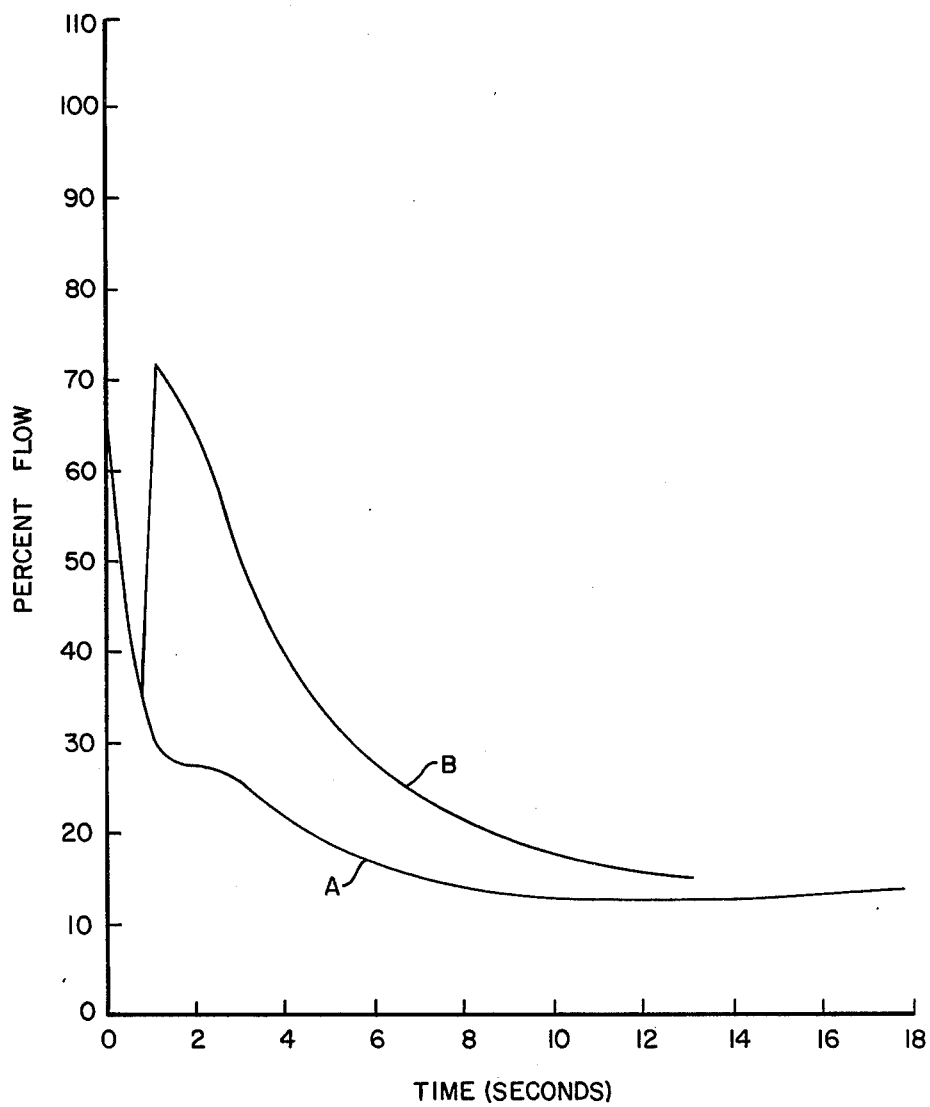
FIG. 4 is a graph showing a coolant flow rate through a nuclear core both with and without this invention.
Figure 5B:
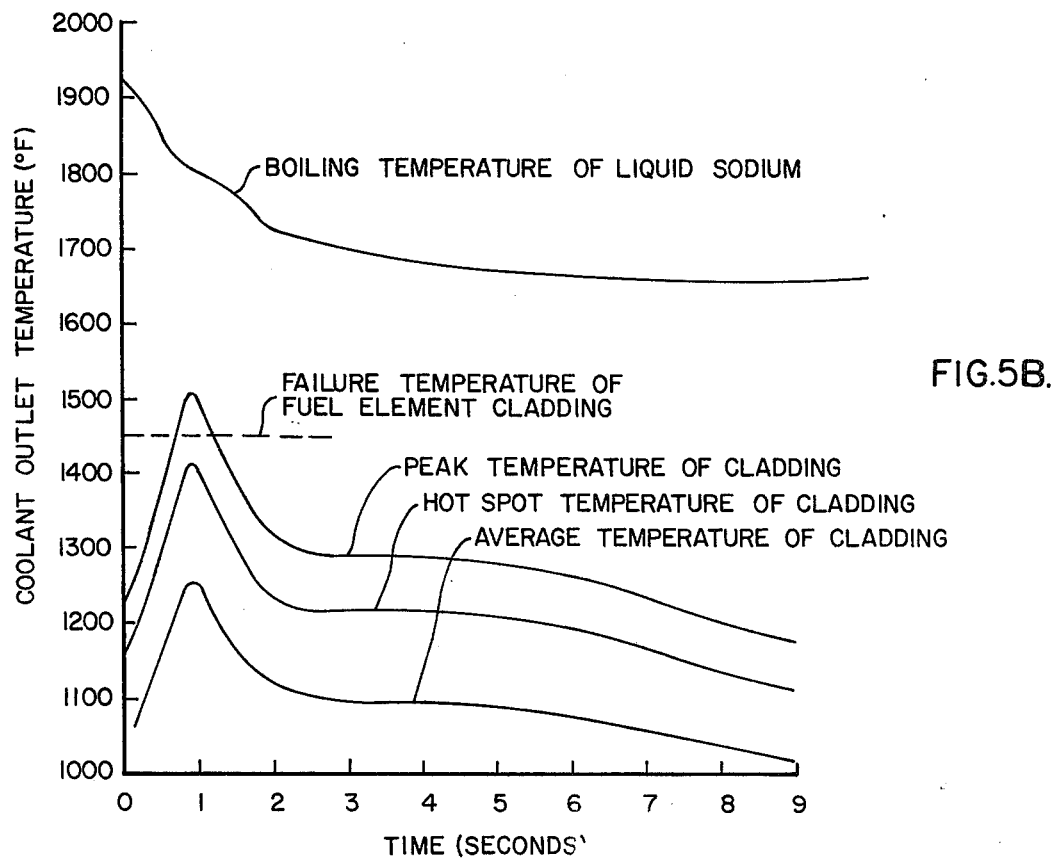

The advantages provided by the disclosed emergency core cooling system, following a double-ended type of pipe rupture, is readily apparent from FIG. 4. In this graph, a comparison is made between the percentage of coolant flowing through the nuclear core 7 as a function of time following the pipe break, both with and without the disclosed emergency core cooling system. Curve B, represents percentage of core flow with the invention; curve A represents percentage of core flow without the invention. Obviously, there is a greater amount of flow through the nuclear core 7 with the invention. FIG. 5b shows the effect of the increased nuclear core flow on the fuel cladding temperature. The average temperature of the cladding is well below the assumed failure temperature of 1450° F. as is the peak cladding temperature. A maximum hot spot temperature does exceed the assumed failure limit but only for a very brief period of time and would not cause melting of the cladding.

Figure 3A:
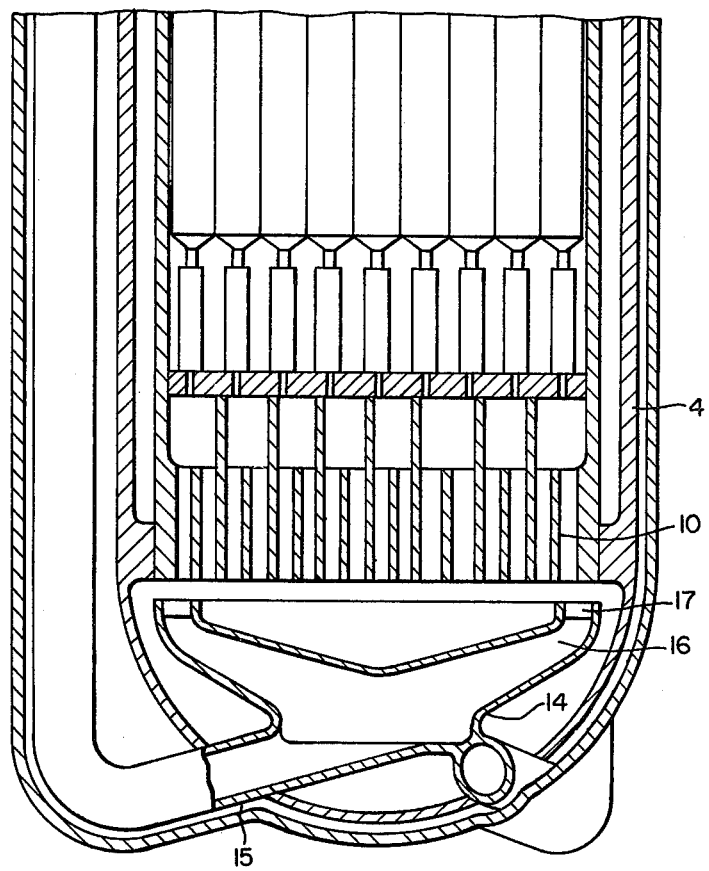
FIGS. 3a and 3b are respectively, vertical and horizontal cross-sectional views of a nuclear reactor vessel incorporating another version of this invention.
Figure 3B:
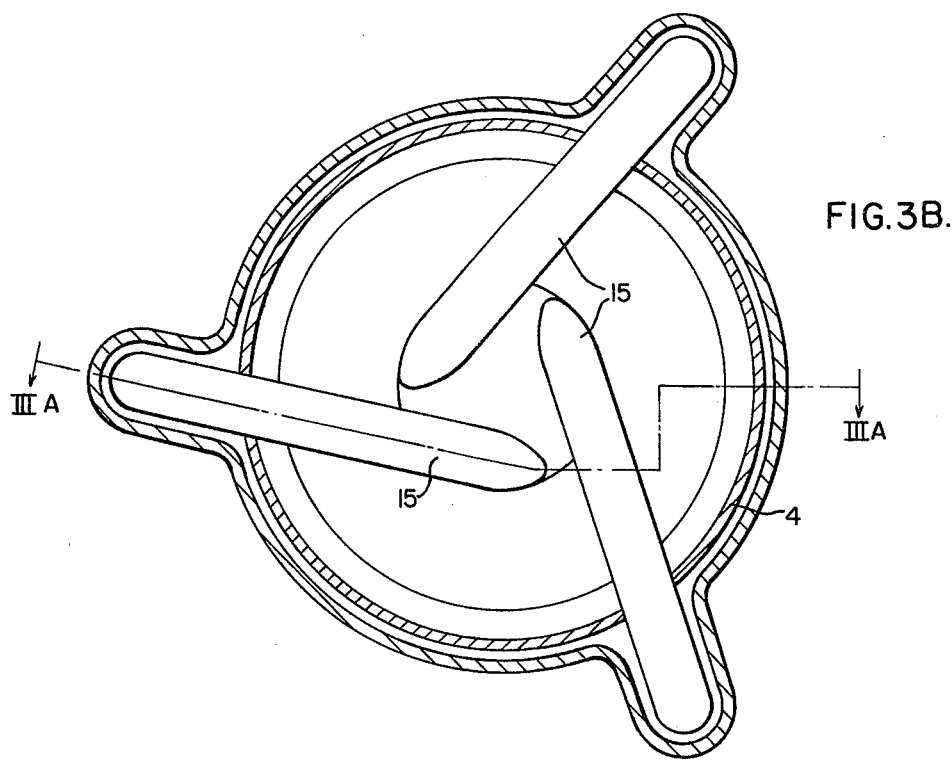

Another version of the emergency core cooling system as provided by this invention is illustrated in FIGS. 3a and 3b. In this embodiment, the hydraulic flow control means is a vortex chamber 14. Inlet flow lines 15, which comprise a portion of the connecting piping 3 (FIG. 1) between the main coolant circulating pump 2 (FIG. 1) and the reactor pressure vessel 4 of each of three primary systems are brought together at the vortex chamber 14. Although three primary systems are used here, it is again to be noted that any number of primary systems, greater than two, may be used and that there are advantages to having a larger number. The inlet lines 15 connect with the vortex chamber 14 in a tangential manner such that the reactor coolant is caused to flow in a circular or whirling motion. The principle of operation of the vortex chamber 14 is the same as that of the velocity chamber 6 (FIG. 2) of the previous embodiment. Here, however, it is the circular motion of the reactor coolant that causes the increase in velocity and a corresponding decrease in static pressure. A radial diffuser 16 is integrally attached to the vortex chamber 14 for the purpose of reconverting the velocity head of the reactor coolant back into static pressure. Appropriate straightening vanes 17 may be included within the outlet of the radial diffuser 16 so that the reactor coolant is flowing in a straight direction parallel to the axial center line of the reactor vessel 4 prior to the entering the lower support structure 10.

One of the principal advantages of the vortex chamber 15 is that axial space can be saved resulting in a shorter reactor vessel 4. Another advantage is that the vortex chamber 14 may be used during normal operation of the reactor to remove any cover or fission gases which may have become entrained in the reactor coolant.

From the foregoing description, taken in connection with the drawings, it is seen that this invention provides an emergency core cooling system which prevents thermally induced core damage by maintaining reactor coolant flow through a nuclear core for a sufficient length of time following a double-ended rupture of a main coolant flow line. Further, the emergency core cooling system contains no moving parts, assuring continuous trouble-free operation without significantly increasing the complexity of the nuclear reactor.

Since numerous changes may be made in the above-described apparatus, different embodiments of the invention may be made without departing from the spirit and scope thereof. It is intended that all the matter contained in the foregoing description or shown in the accompanying drawings shall be interpreted as illustrative and not in a limiting sense.

I claim as my invention:

1. A nuclear reactor comprising a reactor vessel having therein a lower plenum, a nuclear core contained within said reactor vessel above said lower plenum, said nuclear core comprising a plurality of fuel elements containing nuclear fuel, and a plurality of primary coolant flow systems in flow connection with said reactor vessel for circulating a liquid reactor coolant through said reactor vessel and said nuclear core contained therein, said plurality of primary systems all discharging said coolant into a vortex chamber within said vessel lower plenum for joining the coolant inlet flow from said plurality of primary systems and for limiting reverse flow through said nuclear core and one of said primary flow systems in case of a rupture of said one primary flow system.

2. The reactor of claim 1, wherein said vortex chamber comprises apparatus for decreasing the static pressure and increasing the flow velocity of said reactor coolant flowing therein.

3. The reactor of claim 2, including means in series flow connection with said vortex chamber for reconverting said increased flow velocity of said reactor coolant back into static pressure.

4. The reactor of claim 2, wherein said vortex chamber includes means to reconvert said increased velocity of said reactor coolant flowing through said vortex chamber back into static pressure.

5. The reactor of claim 4, wherein said vortex chamber comprises a cylindrically shaped member having pipes attached thereto in a tangential manner, wherein each of said tangentially attached pipes is correspondingly attached to one of said primary flow systems within said pressure vessel, said tangentially attached pipes having a cross-sectional flow area which gradually decreases from an area approximately equal to the flow area of said primary fluid flow systems to a smaller flow area, said smaller flow area being determined in accordance with said increased flow velocity and decreased static pressure of said reactor coolant flowing through said vortex chamber, and wherein said outlet of said vortex chamber comprises a radial flow diffuser, said radial flow diffuser having a cross-sectional flow area which gradually increases until said increased flow velocity is reconverted back into static pressure.

6. The reactor of claim 5, wherein the outlet of said radial flow diffuser includes straightening vanes, said straightening vanes serving to align the flow of said reactor coolant flowing therein with the axial center line of said nuclear core.

7. A nuclear reactor comprising a reactor vessel having therein a lower plenum, a nuclear core contained within said reactor vessel above said lower plenum, said nuclear core comprising a plurality of fuel elements containing nuclear fuel, and a plurality of primary coolant flow systems in flow connection with said reactor vessel for circulating a liquid reactor coolant through said reactor vessel and said nuclear core contained therein, said plurality of primary systems all discharging said coolant into a vortex chamber within said vessel lower plenum for joining the coolant inlet flow from said plurality of primary systems and for limiting reverse flow through said nuclear core and one of said primary flow systems in case of a rupture of said one primary flow system, said vortex chamber connected to said primary fluid flow systems within said reactor vessel and comprising means for decreasing the static pressure of said reactor coolant by increasing the velocity of said reactor coolant flowing through said vortex chamber, said last-named means including a cylindrically shaped member having pipes attached thereto in a tangential manner, wherein each of said tangentially attached pipes is correspondingly attached to one of said primary flow systems within said pressure vessel, said tangentially attached pipes having a cross-sectional flow area which gradually decreases from an area approximately equal to the flow area of said primary fluid flow systems to a smaller flow area, said smaller flow area being determined in accordance with said increased flow velocity and decreased static pressure of said reactor coolant flowing through said vortex chamber, and wherein said outlet of said vortex chamber comprises a radial flow diffuser, said radial flow diffuser having a cross-sectional flow area which gradually increases until said increased flow velocity is reconverted back into static pressure.

8. The reactor of claim 7 wherein the outlet of said radial flow diffuser includes straightening vanes, said straightening vanes serving to align the flow of said reactor coolant flowing therein with the axial center line of said nuclear core.

* * * * *